(12) United States Patent
Yurusov (10) Patent No.: US 11,750,784 B2
(45) Date of Patent: Sep. 5, 2023

(54) AUTOMATIC VIDEO FILE REPAIR METHOD AND SYSTEM

(71) Applicant: MediCapture, Inc., Plymouth Meeting, PA (US)

(72) Inventor: Alexander Yurusov, New Taipei (TW)

(73) Assignee: MediCapture, Inc., Plymouth Meeting, PA (US)

( * ) Notice: Subject to any disclaimer, the term of this patent is extended or adjusted under 35 U.S.C. 154(b) by 0 days.

(21) Appl. No.: 16/428,674

(22) Filed: May 31, 2019

(65) Prior Publication Data

US 2020/0382754 A1 Dec. 3, 2020

(51) Int. Cl.

| G11B 27/10 | (2006.01) |
| H04N 5/77 | (2006.01) |
| H04N 9/87 | (2006.01) |
| H04N 19/46 | (2014.01) |
| G06F 16/23 | (2019.01) |
| G06F 16/78 | (2019.01) |

(52) U.S. Cl.
CPC ........... *H04N 9/87* (2013.01); *G06F 16/2365* (2019.01); *G06F 16/78* (2019.01); *G11B 27/10* (2013.01); *H04N 5/77* (2013.01); *H04N 19/46* (2014.11)

(58) Field of Classification Search
USPC ................................................. 386/241, 248
See application file for complete search history.

(56) References Cited

U.S. PATENT DOCUMENTS

| 7,395,324 B1 * | 7/2008 | Murphy | ............ H04L 41/0803 709/223 |
| 8,942,543 B1 * | 1/2015 | Hubin | ................. H04N 9/8205 386/277 |
| 10,136,163 B2 | 11/2018 | Zhou et al. | |
| 10,289,496 B1 * | 5/2019 | Chopra | ................ G06F 16/284 |
| 10,838,923 B1 * | 11/2020 | Menezes | ............... G06F 3/0608 |
| 10,853,185 B1 * | 12/2020 | Guo | .................... G06F 11/1453 |
| 10,990,518 B1 * | 4/2021 | Wallace | ................... G06F 16/13 |
| 2003/0169931 A1 * | 9/2003 | Lainema | .............. H04N 19/117 375/E7.193 |
| 2003/0215110 A1 * | 11/2003 | Rhoads | ................. G06T 1/0021 382/100 |

(Continued)

FOREIGN PATENT DOCUMENTS

JP 2019-075628 A 5/2019

OTHER PUBLICATIONS

Authorized Officer Vincent Weber, International Search Report and Written Opinion issued in PCT Patent Application No. PCT/US2020/034974 dated Oct. 6, 2020.

*Primary Examiner* — Nigar Chowdhury (74) *Attorney, Agent, or Firm* — KAPLAN BREYER SCHWARZ, LLP (57) ABSTRACT

A method and system for repairing a corrupted video file, includes creating, with a processor, a helper file in a storage device; storing, with the processor, static video and audio parameters in the helper file at a beginning of the recording of a video; storing audio sample sizes in the video file during the recording of the video; and prior to playing back the video, reconstructing, with the processor, an index of the corrupted video file using the static video and audio parameters stored in the helper file, video parameters stored in video file and the audio sample sizes stored in the video file; and appending the reconstructed index to the video file.

16 Claims, 5 Drawing Sheets

(56) References Cited

U.S. PATENT DOCUMENTS

| | | | | |
|---|---|---|---|---|
| 2004/0231001 | A1* | 11/2004 | Kisliakov | H04N 7/17318 348/E7.071 |
| 2005/0216409 | A1* | 9/2005 | McMonagle | G06Q 20/042 705/45 |
| 2007/0270658 | A1* | 11/2007 | Mitchell | G09B 19/00 600/300 |
| 2009/0002379 | A1* | 1/2009 | Baeza | H04N 19/43 345/522 |
| 2009/0003446 | A1* | 1/2009 | Wu | H04N 19/176 375/E7.19 |
| 2009/0003447 | A1* | 1/2009 | Christoffersen | H04N 19/117 375/240.16 |
| 2009/0150200 | A1* | 6/2009 | Siessman | G06Q 10/0631 705/7.12 |
| 2011/0097058 | A1* | 4/2011 | Fan Jiang | G11B 27/034 386/264 |
| 2013/0091571 | A1* | 4/2013 | Lu | G06F 21/563 726/23 |
| 2016/0007048 | A1* | 1/2016 | Zhou | H04N 19/40 375/240.12 |
| 2018/0103271 | A1 | 4/2018 | Stockhammer et al. | |

* cited by examiner

AUTOMATIC VIDEO FILE REPAIR METHOD AND SYSTEM

FIELD

The present disclosure relates to video. More particularly, the present disclosure relates to a method and system for automatically repairing a corrupted video file.

BACKGROUND

Video recording during surgery and/or other medical procedures provides multiple benefits, such as allowing surgeons and other providers to review prior treatments, prevent malpractice claims, teaching, etc. Current systems are configured to generate video files simultaneously with capture of digital video. In some instances, generation of the file and/or video recording may be interrupted prior to completion of the video file, causing video files to become corrupted and/or not useable.

For instance, in some cases power may be interrupted during recording, for example, due to power loss, user error, etc. Current solutions may utilize uninterruptible power supplies (UPS) power back up systems and/or power back-up capacitors inside of the recorder to let video recording get finalized in case of power loss. These solutions have a high cost and can create hazardous conditions for users (such as discharge of power back-up capacitors).

As another example, a user may remove or disconnect a storage medium, such as detachable storage drive, during recording. Current solutions include a mechanical lock to fix the detachable storage connector physically until recording will stop. These solutions require high costs and non-standardized connectors. Further, mechanical locks fail to prevent digital storage failures, such as system crashes, power loss, etc. Current systems fail to provide a reliable method for preventing and/or recovering broken or corrupted video files.

SUMMARY

Disclosed herein is a method for repairing a corrupted video file. The method comprises: creating, with a processor, a helper file in a storage device; storing, with the processor, video parameters in the helper file at a beginning of the recording of a video; and reconstructing, with the processor, an index of the corrupted video file using the certain video parameters stored in the helper file.

In some embodiments of the method, the video parameters stored in the helper file comprise static video parameters.

In some embodiments of the method, the reconstructing of the index comprises finding, with the processor, sample sizes of video samples stored in the video file during the recording of the video.

In some embodiments of the method, the finding of the sample sizes of the video samples is performed by the processor using the video parameters stored in the helper file.

In some embodiments of the method, the video parameter stored in the helper file include a number and types of tracks, a codec used for the video samples and codec configuration data.

In some embodiments of the method, the finding of the sample sizes of the video samples is performed by analyzing a NAL structure of the video samples stored in the video file during the recording of the video.

In some embodiments of the method, the video parameter stored in the helper file includes a codec used for the video samples and wherein the reconstructing of the index comprises finding, with the processor, which video samples stored in the video file during the recording of the video are keyframes using the type of codec used for the video samples and a structure of a video frame of the video sample encoded with the codec.

In some embodiments the method further comprises: storing, with the processor, audio parameters in the helper file at the beginning of the recording of the video; and storing, with the processor, additional audio parameters in the video file during the recording of the video.

In some embodiments of the method, the additional audio parameters stored in the video file are sample sizes of audio samples and wherein the reconstructing of the index comprises finding, with the processor, the audio samples using the sample sizes of the audio samples stored in the video file during the recording of the video.

In some embodiments of the method, the reconstructing of the index comprises finding, with the processor, a last valid video sample.

In some embodiments of the method, the reconstructing of the index further comprises finding, with the processor, a last valid audio sample.

In some embodiments, the method further comprises: truncating, with the processor, the video file after the last valid video and audio samples to create a truncated video file; and appending, with the processor, the reconstructed index to the truncated video file.

In some embodiments, the method further comprises: writing, with the processor, a new video file using valid video and valid audio samples; and appending, with the processor, the reconstructed index to the new video file.

In some embodiments, the method further comprises deleting the helper file.

In some embodiments, the method further comprises detecting the helper file prior to reconstructing of the index.

In some embodiments, the method further comprises checking the helper file to determine if the video parameters are contained therein prior to reconstructing of the index.

In some embodiments, the method further comprises checking the video file to determine if it is corrupt and repairable prior to reconstructing of the index.

Further disclosed herein is a system for repairing a corrupted video file. The system comprises: a processor; a memory module; and a storage device for storing the corrupted video file; wherein the memory module includes instructions, which when executed by the processor performs the above described method and its various embodiments.

BRIEF DESCRIPTION OF THE DRAWING

The disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and the drawing.

DETAILED DESCRIPTION

The following description merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means or step for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Figure 1:
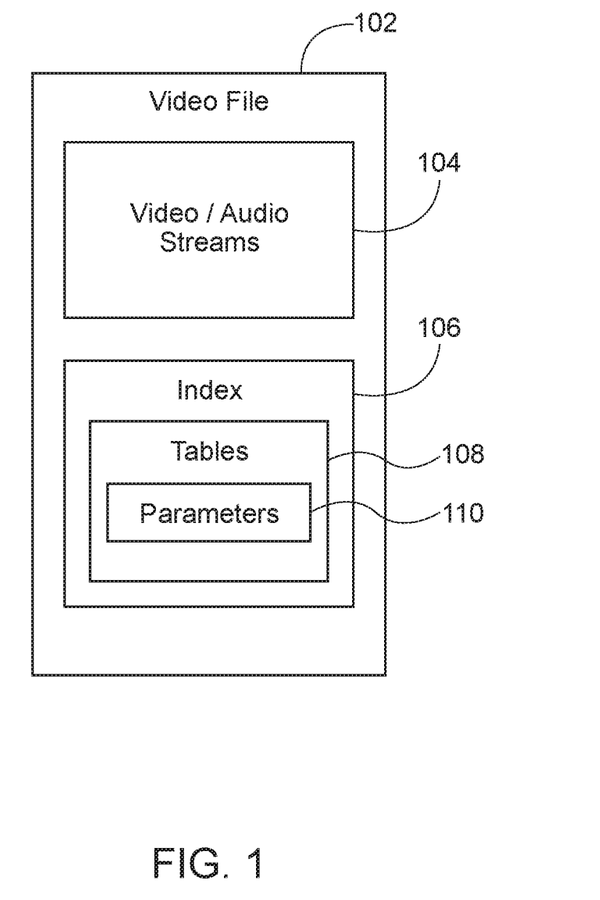
FIG. 1 a schematic diagram of an illustrative embodiment of a video file.

By way of some additional background, reference is made first to FIG. 1, which shows a schematic diagram of an illustrative embodiment of a video file 102. Video file 102 is used for storing a captured video in a storage unit, such as a computer hard drive or a USB flash drive. The format or structure of the video file 102 is typically referred to as a "container." The video file 102 can contain compressed or coded video and audio streams 104 also referred to herein as coded video and audio samples, and an index 106 that contains video and audio parameters 110 that are required for decoding the coded video and audio streams 104 contained in the video file 102, to correctly play them back. In some embodiments, the video file 102 can be an MP4 video file, which is commonly used for storing coded video and audio streams. In some embodiments, the video file 102 can contain only video stream and video parameters, without audio.

Each coded video sample includes a plurality of video frames. In compressed video, some of the video frames in each coded video sample are keyframes, where each key frame contains information about one complete video frame or images. The frames between the keyframes, which comprise the majority of the plurality of video frames in each coded video sample, each contain data only about the difference or changes that occurs between keyframes that allow video be decoded for playback. In some embodiments, the video codec can be H.264 or HEVC and the audio codec can be ACC. In embodiments that use a H.264 or HEVC video codec to compress the video, a network abstraction layer (nal) header is stored with each coded video sample. The nal header contains the size (in bytes) of that coded video sample. The size of each video sample defines the boundaries of that video sample. In contrast, the coded audio samples do not include headers that contain the size of the coded audio samples.

The index 106 of the video file 102 comprises a plurality of tables 108 that contain various video and audio parameters 110 for the coded video and audio streams 104 saved in the video file 102, which parameters are identified with tags. In embodiments where the video file 102 is an MP4 video file, the tags are referred to as MP4 tags. The plurality of tables 108 can comprise a first table containing tags identifying the size (in bytes) of each coded video sample, a second table containing tags identifying the size (in bytes) of each coded audio sample, a third table containing tags identifying key (video) frames, a fourth table containing tags identifying offsets (locations) of each coded video sample that allows access to any video frame, and a fifth table containing tags identifying offsets or locations of each coded audio sample that allows access to any audio frame. The index 106 further comprises one or more additional tables that contain tags identifying other various video and audio parameters including, without limitation, video codec type (e.g., H.264, HEVC, etc.), video encoding frame rate, video encoding sample rate and bitrate, audio codec type, and audio encoding sample rate and bitrate. The index 106 can further comprise one or more other tables containing tags that identify information such as notes, comments, patient, surgeon, the video recording device, etc.

In existing video recording and playback systems, the index 106 of the video file 102 is typically generated and saved with the video file 102 after the video and audio streams 104 have been compressed and stored in the video file 102. When the entire index 106 is generated and saved with the video file 102 without interruption, the video file 102 is considered to be finalized and completed. If an event occurs that interrupts the generation of a portion of the index 106 or the entire index 106, such as a power outage, an unexpected removal of a removable storage device (e.g., a USB flash drive), or a program error, etc., some or all the video and audio parameters 110 required to correctly decode and playback the video and audio streams 104 (video content) saved in the video file 102 will be missing and therefore, the video file 102 is considered to be corrupted.

Figure 2:
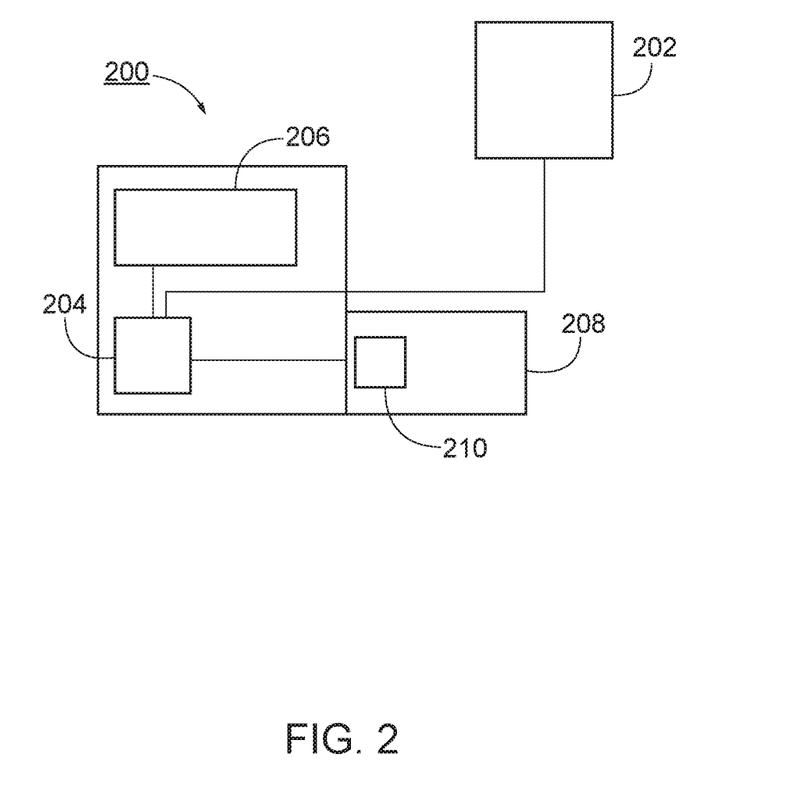
FIG. 2 is a block diagram a digital video recording and playback system according to an illustrative embodiment of the present disclosure.

FIG. 2 is a block diagram of a digital video recording and playback system 200 according an illustrative embodiment of the present disclosure. The system 200 includes a digital video capture device 202, at least one computing device or processor 204 in data communication with the video capture device 202, at least one computer memory module 206 in data communication with the at least one processor 204, and at least one non-volatile storage device 208 (e.g. USB flash memory, hard drive, etc.) in data communication with the at least one processor 204, the at least one storage device 208 storing at least one corrupted video file created with the system 200. The at least one memory module 206 includes instructions, which when executed by the at least one processor 204, causes the processor 204 to perform the methods described below and shown in FIGS. 3 and 5 for repairing the at least one corrupted video file stored in the storage device 208 prior to being played back with the system 200.

Figure 3:
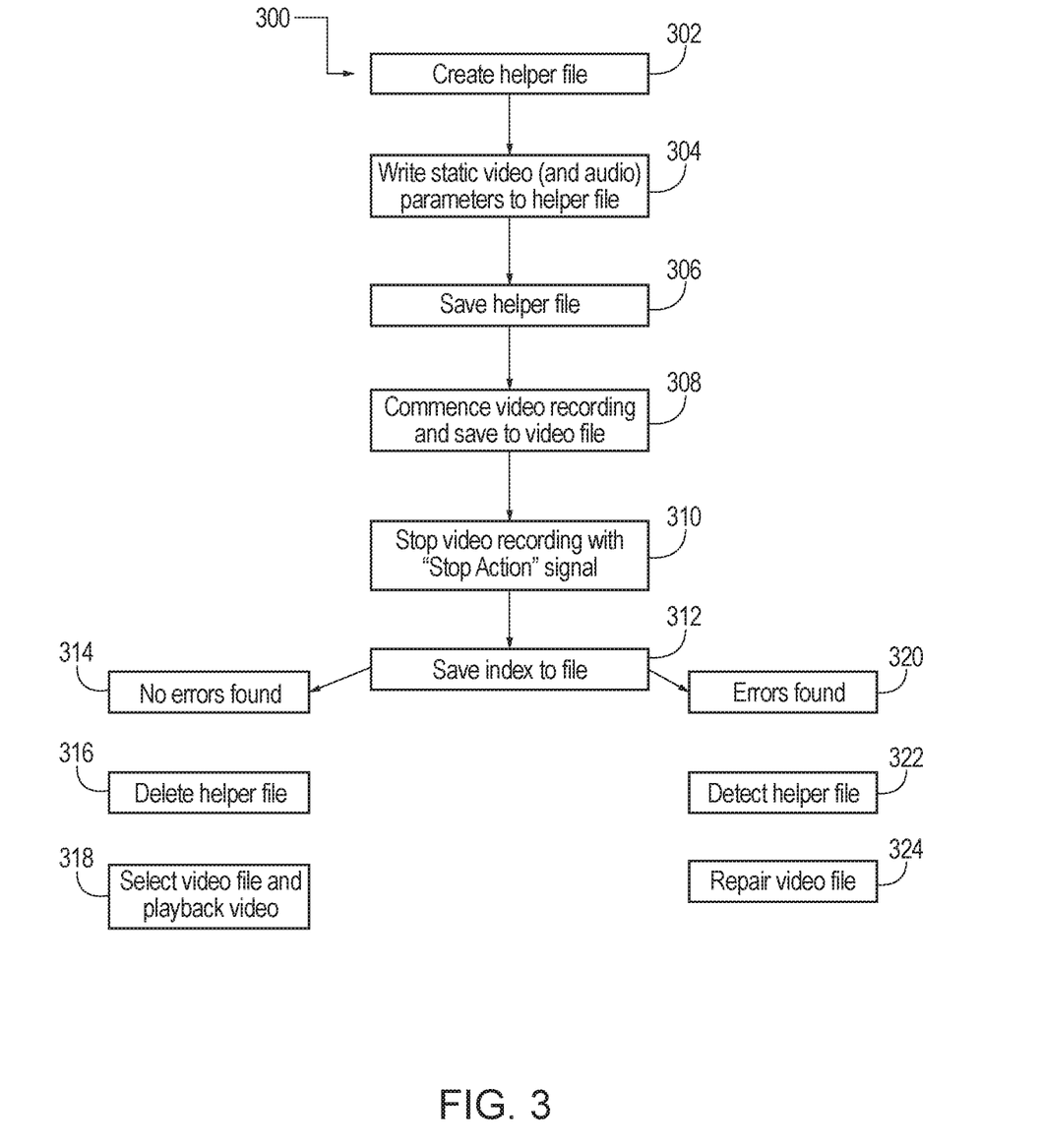
FIG. 3 is a flow chart depicting the steps of a method for repairing a corrupted video file according to an illustrative embodiment of the present disclosure.

Referring now to FIG. 3, there is shown a flow chart depicting the steps of a method 300 for repairing a corrupted video file according to an illustrative embodiment of the present disclosure. In step 302, a helper file is automatically created. In some embodiments, the helper file can be a second video file. Unlike the video file, which will be used for storing the video and audio streams, the helper file will be used for storing tags identifying various static video parameters (and static audio parameters if the video contains audio), which are conventionally stored in the index of the video file. In embodiments where the video file is an MP4 file, the helper file can be a second MP4 file that is used for storing the MP4 tags identifying the various static video parameters (and audio parameters if the video contains audio), which are conventionally stored in the index of the corresponding MP4 video file. Since the tags in existing systems are usually stored in the index at the end of the video file, they are partially or wholly absent in a corrupted video file. In some embodiments, the helper file can be provided with a name similar to corresponding video file. Furthermore, in some embodiments, the name of the helper file can include the prefix ".fix" or ".tmp" before the name of the corresponding video file so that it can be detected later on when the video of the video file is played back. In such embodiments, this ensures that the helper file is hidden, for example, on a Linux operating system, as it begins with a dot extension of the helper file, which is something that doesn't represent the usual file type.

Referring still to FIG. 3, in step 304, certain static video parameters (and certain static audio parameters if the video contains audio) sufficient to repair a video file, should it become corrupted, are automatically written to the helper file. The static video and audio parameters can include the number and types of tracks (video and audio), the codec used for video samples, the codec used for the audio sample (if the video contains audio) the codec configuration data, and other tags. In some embodiments, the static video parameters and written in the helper file include, without limitation, tags identifying the video codec type, the video encoding frame rate, and the video encoding sample rate and bitrate. In embodiments where the video also contains audio, the static audio parameters and written in the helper file can also include the audio codec type and the audio encoding sample rate and bitrate. In other embodiments, the tags identifying the image information mentioned earlier (notes, author, etc.), which are normally stored in the index can also be stored in the helper file.

In contrast to the helper file, a typical video file in MP4 format includes a header, an "mdat" tag containing coded video (and audio samples if the video contains audio), and a "moov" tag. The "moov" tag contains the number and types of tracks (video and audio), the codecs used for samples, codec configuration data, a sample offsets table, a sample size table, the type of sample (audio and video), an index of video keyframes, the total file play time, and other tags. An example of the content of the header file in MP4 format includes a header and a "moov" tag containing the number and types of tracks (video and audio), the codecs used for samples, the codec configuration data, and other tags.

Figure 4:
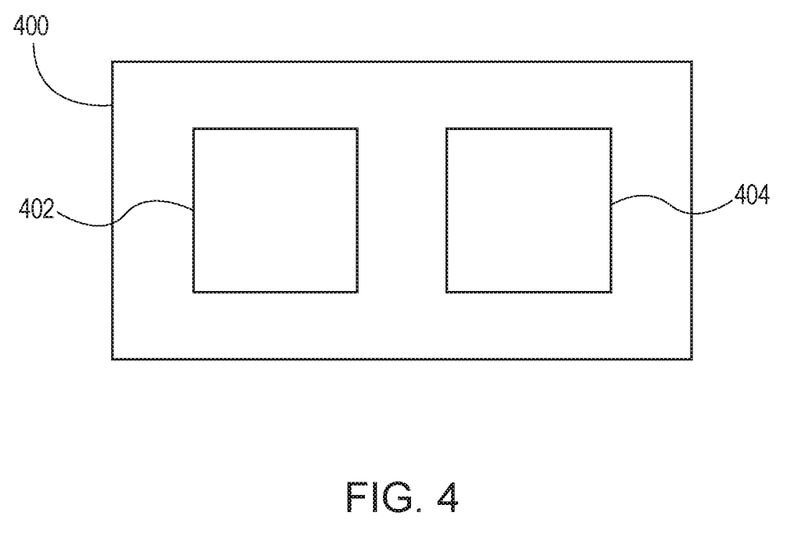
FIG. 4 is schematic diagram of an illustrative embodiment of a folder for containing a video file and a corresponding helper file.

In step 306 of the method of FIG. 3, the helper file is saved in a non-volatile storage device (USB flash drive, hard drive, etc.). As shown in FIG. 4, in some embodiments, the helper file 404 can be saved in the same non-volatile storage device (USB flash drive, hard drive, etc.) and the same folder 400, as corresponding video file 402 will be saved in. In other embodiments, the helper file can be saved separately from the video file in another non-volatile storage device. There, however, are practical reasons for saving the helper file in same device storage (and maybe also same folder) as the video file (e.g. USB storage device). For example, the helper file can then travel with a potentially corrupted video file (in same folder or USB disk), and potentially can be fixed/repaired on another computer system other than the system the video file was originally created.

Referring again to FIG. 3, steps 302, 304 and 306 are performed at the beginning of the recording of the corresponding video. Therefore, the helper file does not contain coded video (and audio) samples (e.g., the mdat section is absent), since at the very beginning of the recording process, the corresponding video has not been recorded yet. Thus, the helper file also does not contain sample sizes, offsets, types, keyframes, total play time, etc. Accordingly, the helper file is very small in size compared to the video file, however, it contains essential information that can be used later on to repair a corrupted video file. One or ordinary skill in the art will appreciate that performing steps 302, 304 and 306 at the beginning of the recording of the corresponding video, increases the chance that the helper file will not become corrupted. In this way, helper file offers essential information about the video recording in advance, not at the end of the video recording where this essential information may be absent if the finalization and completion of the video file is interrupted.

In step 308 of the method shown in FIG. 3, the video recording commences and incoming video (and audio data if the video contains audio) is compressed by encoder(s) and is accumulated in a memory of the system. When a next chunk of data (video or audio frame) is ready to be stored to the non-volatile storage device, the accumulated chunk of data is written into the video file and later information about this chunk of data (type, size, offset, other parameters) is stored to the video file.

Further in step 308, certain audio parameters, which are usually stored in the index that is created at the end of the recording during the finalizing of the video file in existing systems, can be stored in the video file itself, as the compressed video and audio streams/samples are being stored in the video file. The audio parameters stored in the video file can include its designation as an audio sample and the size of every coded audio sample (e.g., 4 bytes per audio sample), which is required to know the boundaries of the audio samples. The size of every coded audio sample is stored in the video file as part of that particular audio sample.

During the recording, the coded video samples and the coded audio samples can be stored in the video file in any order, for example, 3 coded video samples that typically contain 1 video frame each can be followed by 1 audio sample of ⅒ of a second. In another example, 30 coded video samples can be followed by 1 coded audio sample of 1 second. In existing systems, the designation and the size of every coded audio sample is not stored in the video file because this parameter is stored in the index of the corresponding video file, if the video file, and in particular, the index is completed and finalized without interruption. Therefore, if the index of the video file is corrupted such that the table containing tags identifying the sizes of the coded audio samples is partially or wholly missing or lost, the designation and size of all the coded audio samples including the designation and size of each missing or lost coded audio sample can be obtained in accordance with the present disclosure from the coded audio samples stored in the video file.

It should be apparent to one of ordinary skill in the art that because the sequence of the coded video and audio samples and the sizes thereof can be different, it is necessary to store in the video file and the helper file all the parameters that will clearly identify every sample, it's location, size and designation as video or audio.

The processes of step 308 are repeated over and over again until video recording is stopped in step 310 by a "stop action" signal. The "stop action" signal, in some embodiments, can be the pressing of a button by the user, which stops the video recording, or with any other means that creates a "stop action" signal.

In step 312 of the method shown in FIG. 3, all the data collected for the index during the recording step 308 is saved to the end of the video file in response to the stop action signal. The index includes tables of sample sizes, offsets, types, keyframes, etc., as described earlier. If no errors are detected during the creation and writing of the index to the video file at step 314, then the recording is considered to have been performed successfully and the video file is deemed properly finalized and complete. Therefore, the helper file is deleted in step 316. When the video file is selected for playback in step 318, no helper file will be detected and the video contained in the video file will be played backed. If errors are detected during the creation and writing of the index to the video file at step 320, which results in a partial index or the absence of an index, then the helper file containing the earlier described static video (and audio) parameters remains and is automatically detected in step 322 when the video file is selected for playback. Step 322 anticipates that the video file is corrupted if a corresponding helper file exists when the video file is selected for playback. In step 324, the video file is automatically repaired using the static video (and audio) parameters written to and saved in corresponding the helper file detected in step 322 and written and saved to the video file itself.

In other embodiments, the step 324 of repair process of the method of FIG. 3 can be triggered when a new storage device is mounted into the video recording and playback system after powering on the system (e.g., USB device), instead of by step 322. For example, during a video recording, the storage device may be accidentally removed, thus, leaving an unfinished video file in it. Later the user plugs the storage device back into the system and the last corrupted (unfinished) file will be repaired automatically. In another example, a power outage (interruption) may occur during the video recording. After the power is restored, the unfinished file will be repaired automatically making system "user-friendly" or "stupid-proof" by detecting and repairing the corrupted video file without additional user interaction. In such embodiments, the last folder is checked to determine if it contains a helper file. If the helper file is present, the step 320 repair process is performed.

Figure 5:
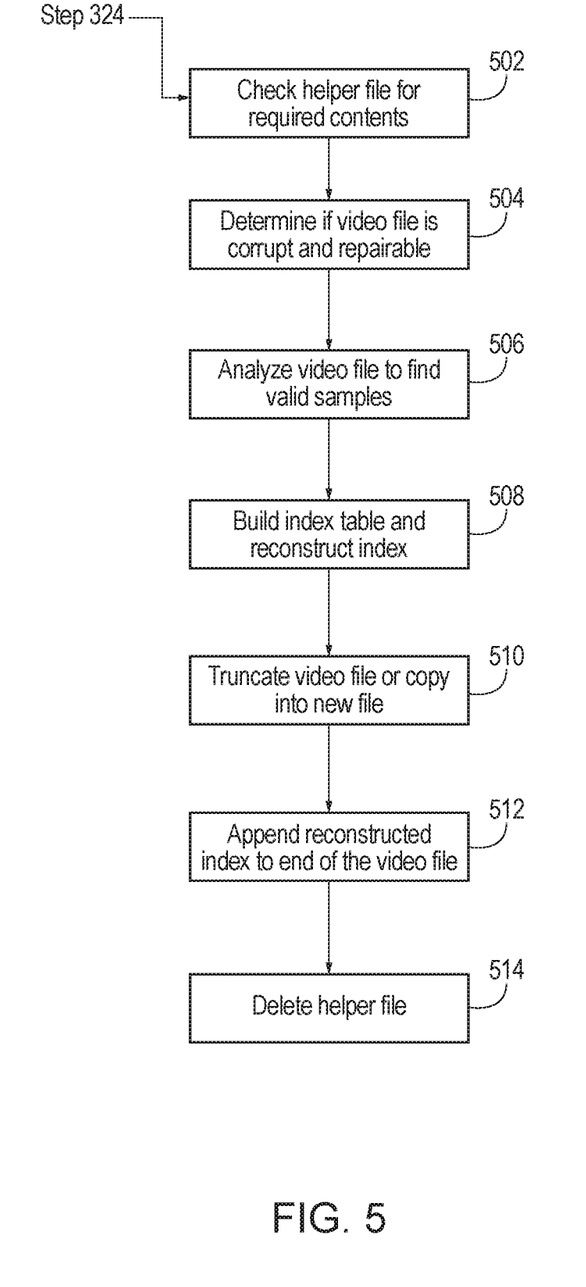
FIG. 5 is a flowchart that details step 324 of FIG. 3, according to an illustrative embodiment of the present disclosure.

FIG. 5 is a flowchart that details step 324 of FIG. 3, according to an illustrative embodiment of the present disclosure, wherein the video file is automatically repaired using the video and audio parameters saved in the video file and the helper file. In order to successfully repair the video file, the helper file itself must be in good condition, i.e., contains all the required static video (and audio) parameters described earlier. The repair operation assumes that the helper file may also be corrupted, and in such a case, the repair of the video file would not possible in accordance with the present disclosure and therefore, the helper file may be discarded/deleted, and the corrupted video file considered not repairable. Therefore, in step 502, the helper file is analyzed to determine whether it contains the expected static video (and audio) parameters.

If, in step 502, the helper file is determined to contain the expected static video (and audio) parameters, then in step 504, the corrupted video file is examined to determine whether it is in a state that allows it to be repaired or does not need to be repaired. For example, if the analysis reveals that the video file does not contain coded video and/or audio samples, does not contain the expected video file structure, it's size is 0 bytes, or it does not exist at all, then the video file is not repairable (and may be discarded/deleted). In another example, the analysis may be reveal that the video file is in fact not corrupted, and is fully functional. In such an example, the presence of the helper file will be considered a false alarm (e.g. the helper file was not successfully deleted). Consequently, the helper file can be deleted, and the video file considered as valid, so no other action is needed on video file.

If in step 504, the video file is found to be corrupted and repairable, then in step 506, the video file is analyzed to find expected structures therein or valid coded video (and audio) samples. More specifically, the coded video (and audio) samples are searched starting at the beginning of the video file and moving toward the end until a point is reached in the video file where the sample data is not entirely written, or sample is otherwise corrupted, by examining the first few bytes of the header of every sample to determine the boundaries of each sample. This analysis can include checking the size of each coded video (and audio) sample and typical signatures at the beginning and end of each sample. Searching for sample boundaries is required for reconstructing sample offsets, sizes, the type of sample (video or audio), the index of video keyframes, and the total file play time, to create the missing index tables. This information is not known from the partial or missing index, and must be determined by examining the data at the beginning of each sample.

Thus, in step 506, raw unknown data of the corrupted video file must be analyzed using a detection technique to categorize sample data. The only available information about the actual coded video samples is data in the corrupted video file itself. Therefore, in some embodiments, the NAL structure of the coded video samples (where H.264 and HEVC codec is used) stored in the video file (MP4) is used to search the coded video sample sizes, where each coded video sample starts with 32-bit size value.

Finding the boundaries of the coded audio samples in step 506, which are usually interleaved with the coded video samples, requires a different technique, as audio codecs such as AAC, MP3, and the like, do not store a NAL header in sample data, so detection of audio samples requires another approach. Therefore, the sizes of the coded audio samples are injected or written into the MP4 video file in step 308 described earlier, and are used to find the boundaries of the coded audio samples. These values may be similar to video NAL sample size (32 bit value), but to distinguish the audio samples from the video samples, the value may be written in step 308 as negative value, which serves as indicator that negative sample size is for audio, and positive sample size is video NAL header. It should be noted that video NAL header is a conventional part of the sample data and is, therefore, expected by video decoder to be present, while the injected audio negative sample size is not part of the conventional audio sample data expected by the decoder, and as such, must be skipped from final index tables (offset/size). These audio markers exist in the video file, unseen to system's video player but, are expected by processor of the system when executing instructions corresponding to the present method.

As part of finding sample boundaries, step 506 includes detecting which coded video samples are keyframes. This information is particularly important for the system's video player seek function, as the system's video player can seek only to video keyframes (the system's video player would work also without this information, but seeking would be impossible or very slow). In some embodiments, the method for detecting which coded video samples are keyframes is based on the knowledge of actual video codec used which is obtained from the helper file, and the structure (header) of the video frame encoded with the codec and saved in the video file. For supporting common codecs H.264 and HEVC, step 506 analyzes another 32 bit value following the NAL header, and determines the frame type as follows:

for H.264 codec: when the top 4 bits have a value of "2," the frame is a keyframe;

for HEVC codec: when top 4 bits have a value of "6," the frame is a keyframe.

If the video file is encoded with another video codec different from H.264 or HEVC, the support for detecting a keyframe for that particular codec should be provided.

When sample size is read and validated to be correct (within file boundaries), the rest of sample data is passed without analysis, and the step 506 process of finding valid samples continues in a loop until an error is detected (e.g. the end of video file or an incomplete sample with its size beyond the end of the actual video file). After this, the offset will be found after the last valid sample, and any data written after this is considered to be corrupted.

As the sample offsets, sizes, keyframe indexes, and the total video play time parameters are found in the video file analysis of step 506, these parameters are collected and built into index tables in step 508 to reconstruct the index of the video file.

In step 510, the video file can be truncated after the last valid coded sample is found by modifying the file size and thereby removing all the invalid coded video and audio samples from the video file. This step is typically performed if the video file is large in size, because it can take a considerable amount of time and/or space to copy the valid video and audio samples and other valid data (data from a partially completed index) into a new file. Actual truncation of video file may be done either in-place on the video file itself by system's input-output function. In other embodiments, data can be copied into a new file in step 510 instead of truncating the video file. The decision whether to truncate the video file depends on file storage system where the video file is stored (if the file system allows truncation), and also on possible need to preserve the corrupted file in its original state.

In step 512, the reconstructed index is appended to end of the video file. In some embodiments, the file system typically allows appending new data (the reconstructed index) to the existing video file. In other embodiments, the reconstructed index can be appended to a new copy of the video file mentioned earlier in step 510. In embodiments where the video file is an MP4 file, the reconstructed index is appended as a "moov" tag. In some embodiments, other structures of the video file may be fixed at this time. For example, an MP4 video file contains tags and their sizes. Therefore, the method will seek back and write the new size of the "mdat" tag to contain correct size of sample data.

After successfully repairing the video file, the helper file can be deleted or otherwise invalidated in step 514, so that it does not serve as a signal of a corrupted video file.

It should be understood that the invention is not limited to the embodiments illustrated and described herein. Rather, the appended claims should be construed broadly to include other variants and embodiments of the invention, which may be made by those skilled in the art without departing from the scope and range of equivalents of the invention. It is indeed intended that the scope of the invention should be determined by proper interpretation and construction of the appended claims and their legal equivalents, as understood by those of skill in the art relying upon the disclosure in this specification and the attached drawings.

What is claimed is:

1. A method for repairing a video file that has been corrupted due to an event that interrupts a generation of a portion of an index of the video file containing static video parameters, the method comprising:

creating, with a processor, a helper file in a storage device, wherein the helper file is identified in a manner that associates it with a video file, wherein the helper file is separate from the video file, and wherein the video file is stored in a storage device separate from the storage device where the helper file is stored;

before video recording, storing in the helper file with the processor, the static video parameters, the static video parameters including a number and types of tracks, a codec used for the video samples and codec configuration data, wherein the static video parameters would normally be contained in a completed index of the video file generated after the video recording is completed if no event that interrupts the generation of the index has occurred, the generation and storing of the completed index with the video file being operative to finalize the video file so that it is playable, wherein the static video parameters directly correspond to a the video to be recorded and stored in the video file, and wherein the helper file does not contain video samples;

storing, with the processor, the video in the video file; and reconstructing, with the processor, the index of the video file using one or more of the static video parameters stored in the helper file if the index of the video file is found to be corrupted due to an event that interrupts the generation of the portion of the index of the video file that would have contained the missing ones of the static video parameters, had the video file not been corrupted.

2. The method of claim 1, wherein the reconstructing of the index comprises finding, with the processor, sample sizes of video samples stored in the video file during the recording of the video.

3. The method of claim 2, wherein the finding of the sample sizes is performed by the processor using the static video parameters stored in the helper file.

4. The method of claim 2, wherein the finding of the sample sizes of the video samples is performed by analyzing a NAL structure of the video samples stored in the video file during the recording of the video.

5. The method of claim 1, wherein the static video parameters stored in the helper file includes a codec used for the video samples and wherein the reconstructing of the index comprises finding, with the processor, which video samples stored in the video file during the recording of the video are keyframes using the type of codec used for the video samples and a structure of a video frame of the video sample encoded with the codec.

6. The method of claim 1, further comprising:
storing, with the processor, audio parameters in the helper file before recording the video; and
storing, with the processor, additional audio parameters in the video file during the recording of the video.

7. The method of claim 6, wherein the additional audio parameters stored in the video file are sample sizes of audio samples and wherein the reconstructing of the index comprises finding, with the processor, the audio samples using the sample sizes of the audio samples stored in the video file during the recording of the video.

8. The method of claim 1, wherein the reconstructing of the index comprises finding, with the processor, a last valid video sample.

9. The method of claim 8, wherein the reconstructing of the index further comprises finding, with the processor, a last valid audio sample.

10. The method of claim 9, further comprising
truncating, with the processor, the video file after the last valid video and audio samples to create a truncated video file; and
appending, with the processor, the reconstructed index to the truncated video file.

11. The method of claim 10, further comprising deleting the helper file.

12. The method of claim 9, further comprising:
writing, with the processor, a new video file using valid video and valid audio samples; and
appending, with the processor, the reconstructed index to the new video file.

13. The method of claim 1, wherein prior to reconstructing of the index, further comprising detecting the helper file.

14. The method of claim 1, wherein prior to reconstructing of the index, further comprising checking the helper file to determine if the static video parameters are contained therein.

15. The method of claim 1, wherein prior to reconstructing of the index further comprising checking the video file to determine if it is corrupt and repairable.

16. A system for repairing a video file that has been corrupted due to an event that interrupts a generation of a portion of an index of the video file containing static video parameters, the system comprising:
a processor;
a memory module; and
a storage device;
wherein the memory module includes instructions for execution by the processor to:
create a helper file in the storage device, wherein the helper file is identified in a manner that associates it with a video file, wherein the helper file is separate from the video file, and wherein the video file is stored in a storage device separate from the storage device where the helper file is stored;
before video recording, store the static video parameters in the helper file, the static video parameters including a number and types of tracks, a codec used for the video samples and codec configuration data, wherein the static video parameters would normally be contained in a completed index of the video file that is generated and stored with the video file after the video is recorded if no event that interrupts a generation of the index has occurred, the generation and storing of the completed index with the video file being operative to finalize the video file so that it is playable, wherein the static video parameters directly correspond to a video to be recorded and stored in the video file and wherein the helper file does not contain video samples;
store the video in the video file; and
reconstruct the index of the video file using one or more of the static video parameters stored in the helper file if the index of the video file is found to be corrupted due to an event that interrupts the generation of the portion of the index of the video file that would have contained the missing ones of the static video parameters, had the video file not been corrupted.

* * * * *